United States Patent [19]

Courtney et al.

[11] 3,983,053

[45] Sept. 28, 1976

[54] COATED ADSORBENT MATERIALS

[75] Inventors: James McNiven Courtney, Lenzie; Thomas Gilchrist, Ayr, both of Scotland; Eric Hutton Dunlop, Sidcup, England

[73] Assignee: The University of Strathclyde, Glasgow, Scotland

[22] Filed: July 2, 1974

[21] Appl. No.: 485,150

[30] Foreign Application Priority Data

July 5, 1973    United Kingdom............... 32059/73

[52] U.S. Cl................................. 252/430; 252/426; 252/428; 210/24; 424/78; 424/79; 424/81
[51] Int. Cl.².......................................... B01D 13/00
[58] Field of Search..................... 252/428, 430, 426

[56] References Cited
UNITED STATES PATENTS

| | | | |
|---|---|---|---|
| 2,842,504 | 7/1958 | Jones................................... | 252/430 |
| 2,876,133 | 3/1959 | Iler et al......................... | 252/430 X |
| 2,952,643 | 9/1960 | Voge................................ | 252/428 X |
| 2,976,253 | 3/1961 | Edwards ............................ | 252/430 |
| 3,424,588 | 1/1969 | Dohman et al. ................ | 252/430 X |
| 3,442,819 | 5/1969 | Herbert............................... | 252/428 |
| 3,941,718 | 3/1976 | Barabas et al. ................. | 252/428 X |

*Primary Examiner*—Patrick P. Garvin
*Attorney, Agent, or Firm*—Mason, Fenwick & Lawrence

[57] ABSTRACT

An adsorbent material intended particularly for use in extracorporeal haemodialysis, is described which is composed of granules of an adsorbent which are coated with a biocompatible polymeric membrane which is semipermeable to the solutes selected for removal. The polymer is a copolymer containing carboxyl and amino groups. In use, solutes pass selectively through the membrane and are trapped by adsorption in the adsorbent thereby preventing or at least reducing the reverse process. To improve biocompatibility the product may be further coated with a plasma protein.

8 Claims, No Drawings

COATED ADSORBENT MATERIALS

This invention relates to coated adsorbent materials.

Previously charcoal or active carbon has been coated with a film of collodion or with a film of a polymer formed by polymerising a monoester of a monounsaturated acid with a crosslinking agent comprising a diester of the same acid. The main reason for coating the charcoal is to form a biocompatible surface so that the charcoal can be used in medical procedures.

According to the present invention there is provided an adsorbent material comprising a particulate or granular adsorbent having a semipermeable membranous coating thereon, said coating comprising a copolymer of a first monomer the homopolymer of which is water-soluble or highly hydrophilic and a second monomer the homopolymer of which is water-insoluble.

The first monomer is selected from the group consisting of acrylic acid, methacrylic acid, itaconic acid, acrylamide, hydroxyacrylamide, vinyl pyrrolidone, dimethylaminoethyl acrylate, diethylaminoethyl acrylate, dimethylaminoethyl methacrylate, diethylaminoethyl methacrylate and hydroxyethyl methacrylate. The second monomer is selected from the group consisting of esters of methacrylic acid, esters of acrylic acid, esters of itaconic acid, acrylonitrile, methacrylonitrile, 2-vinyl pyridine, 2-methyl-5-vinyl pyridine and styrene. The said esters are selected from the group consisting of the methyl, ethyl, propyl, n-butyl, n-amyl, n-hexyl, n-heptyl, n-octyl, isobutyl, sec-butyl, iso-amyl, t-butylaminoethyl and hydroxypropyl.

The copolymer may be formed by polymerising a water-soluble monomer in an aqueous solution of a suitable water-soluble polymer. The water-soluble monomer may be acrylonitrile while the water-soluble polymer may be poly(acrylic acid), poly(methacrylic acid), poly(vinyl pyrrolidone), a polyamide, poly(ethylene oxide), poly(vinyl alcohol) or polyacrylamide.

There is a wide choice of adsorbent, the only criterion being that the chosen adsorbent should be capable of absorbing the solute it is intended to remove from solution; suitable adsorbents are charcoal or active carbon, alumina, silica gel, ion-exchange resin, granulated clay, chalk, starch, molecular sieves, diatomaceous earths, dialdehyde starch, poly(acrylic acid), poly(ethylene oxide), poly(propylene oxide), poly(propylene glycol), polybenzylpyrrolidone, p-trimethylammonium benzaldehyde chloride or other synthetic resinious adsorbents. Of the foregoing the most preferred are active carbon charcoal, particularly charcoal which has been pulverised to a fine grain size and then shaped by compaction of the grains under pressure and extrusion.

After coating of the absorbent with the polymeric material the coated material may be treated with an alkylene oxide to modify the properties of the coating. The use of a gaseous alkylene oxide to sterilise medical materials is well known. It has also been found that when many polymeric membranes are treated in this way, their properties are improved, for example wet strength and transport characteristics are increased (see British Patent Specification No. 1,411,843).

The membrane-forming polymer may be chosen for its selectivity towards a particular species of dissolved substance. While the coated adsorbents of the invention may be employed in any circumstance in which conventional adsorbents have been used, their most interesting application is in the field of medicine. For example, some coated adsorbents of the invention are capable of removing exogenous or endogenous poisons from whole blood or other body fluids.

Selected species of poisons may be removed from blood by perfusion through a column of the coated adsorbent.

The biocompatibility of the coated adsorbents of the invention is good; there is only a small medically-acceptable amount of damage to blood platelet cells during contact. This amount may be reduced even further by treating the coated adsorbent with a plasma protein such as albumin to form a biological surface thereon (for example, see U.S. Pat. No. 3,442,819 which describes the application of a plasma-coated material in which an adsorbent is coated directly with plasma protein). During perfusion of blood there is a descrease in the number of leucocytes but very soon after cessation of treatment the count returns to normal. The mechanism of this phenomenon is not known as the leucocytes are not absorbed by the absorbent.

Adsorbents of the invention may also be used to remove from solution in biological fluids compounds such as creatinine and bilirubin, the removal range including protein-bound molecules.

Of toxins which may be removed from blood paracetamol and glutethimide are examples. In high doses paracetamol leads almost inevitably to irreparable damage of the liver and subsequent failure. By using an adsorbent of this invention, paracetamol may be absorbed from a patient's blood in vivo.

The adsorbents of the present invention can be prepared by immersion of adsorbent particles in a solution of the desired membrane-forming polymer, removing the particles and drying same. Alternative processes are spray-coating or coating by the application of an electrostatic charge, the latter process being described in our copending Application Ser. No. 541,337 of Jan. 15, 1975.

The present invention will now be described by way of illustration in the following Examples.

EXAMPLE 1

Extruded particles of charcoal were washed free of fines, dried and steam sterilized. The cleaned particles were stirred in a solution of a copolymer of acrylic acid (AA) and n-butyl methacrylate (NBMA) in dimethylformamide (DMF). The copolymer was prepared from a monomer weight ratio of AA:NBMA of 40:60 and 0.5% by weight of the polymer coating was applied. The particles were removed from the solution and the solvent evaporated to leave a membranous coating on the particles.

The adsorption properties of the coated particles was determined by using a 100g/100ml solution of paracetamol in water. A sample of the coated charcoal was shaken for a period of time with the solution of paracetamol. The solution was analysed at regular intervals to determine the fall in concentration caused by adsorption. It was found that $t^{1}/2$, the time taken for the concentration to reach one half of its initial value, was 24 minutes. The corresponding value for uncoated charcoal was 8 minutes.

EXAMPLE 2

Charcoal particles were prepared as in Example 1 and the particles coated in a similar manner using a solution of a copolymer of dimethylaminoethyl methacrylate (DMAEMA) and acrylonitrile (AN) in DMF. The copolymer was prepared from a monomer weight ratio of DMAEMA/AN of 15:85. An 0.5% by weight polymer coating was applied. The removal of paracetamol was determined as in Example 1. The $t^1/2$ value was 9 minutes.

EXAMPLE 3

Charcoal particles were prepared as in Example 1 and the particles coated in a similar manner using a solution of a copolymer of AA and AN in DMF. The copolymer was prepared from a monomer weight ratio of AA:AN of 40:60. An 0.5% by weight polymer coating was applied. The removal of paracetamol was determined as in Example 1. The $t^1/2$ value was 18 minutes.

EXAMPLE 4

Charcoal particles were prepared as in Example 1 and the particles coated in a similar manner using a solution of a copolymer of poly(acrylic acid) (PAA) and AN in DMF. The copolymer was prepared from a weight ratio of PAA:AN of 25:75. An 0.5% by weight polymer coating was applied. The removal of paracetamol was determined as in Example 1. The $t^1/2$ value was 19 minutes.

EXAMPLE 5

Particles of extruded charcoal were prepared and coated as in Example 1 but with three different coating weights of AA-NBMA copolymer, viz. 0.5, 1.0 and 2.5%. The removal of creatinine, solution concentration 100mg/100ml, was determined by the manner described in Example 1. Over a period of one hour the relative drops in creatinine concentration and the corresponding value for uncoated charcoal were as follows:

| Polymer Coating Weight (%) | Fall in Creatinine Concentration after 1 hour (%) |
| --- | --- |
| 0.5 | 73 |
| 1.0 | 47 |
| 2.5 | 12 |
| uncoated | 92 |

EXAMPLE 6

Samples of DOWEX 1 × 8 (Trade Mark) ion exchange resin, screened to 20–50 U.S. mesh, were coated with a copolymer of DMAEMA and AN prepared from a monomer weight ratio DMAEMA/AN of 15:85. Coating weights of 2 and 4% by weight were prepared.

Each sample was tested by agitation of 0.5g thereof in 10ml of a solution of 5mg% bromosulphthalein (BSP) in 0.9% sodium chloride and the rate of adsorption of BSP determined.

Over a period of one hour, both the 2 and 4% coated resin adsorbed 34% of the BSP. The corresponding values for uncoated resin and DMAEMA/AN copolymer were 20% and 1% respectively.

2.5g of the 2% coated resin were stirred with 10ml of the BSP solution. Over a period of one hour the coated resin adsorbed 59% of the BSP. The corresponding value for uncoated resin was 31%.

EXAMPLE 7

Granules of DOWEX 1 × 4 (Trade Mark) ion exchange resin, screened to 20–50 U.S. mesh size, were coated as in Example 8 with a coating weight of DMAEMA/AN copolymer of 2%. The sample was tested for BSP adsorption by the method described in Example 8. All the BSP was removed within a period of 15 minutes. A similar result was obtained for uncoated resin.

The coated resin was tested for removal of BSP from a 5mg% solution of human plasma. Over a period of one hour, the coated resin adsorbed 30% of the BSP. The corresponding value for uncoated resin was 20%.

We claim:

1. A solute-adsorptive material composed of granules of an adsorbent capable of binding the solute and on the adsorbent granules of polymeric membraneous coating which is semi-permeable to selected solute or solutes, the polymeric coating being a copolymer of a first comonomer, and a second comonomer, the first comonomer being selected from the group consisting of acrylic acid, methacylic acid, itaconic acid, acrylamide, hydroxyacrylamide, vinyl pyrrolidone, dimethylaminoethyl acrylate, diethylaminoethyl acrylate, dimethylaminoethyl methacrylate, diethylaminoethyl methacrylate and hydroxyethyl methacrylate and the second comonomer being selected from the group consisting of acrylonitrile, methacrylonitrile, 2-vinylpyridine, 2-methyl-5-vinylpyridne, styrene and the $C_1$ to $C_8$ alkyl esters and the tert-butylaminoethyl and hydroxypropyl esters of acrylic, methacrylic and itaconic acids.

2. A solute adsorptive material according to claim 1, in which the particulate granular adsorbent is selected from the group consisting of charcoal, active carbon, alumina, silica gel, ion-exchange resin, granulated clay, chalk, starch, molecular sieves, diatomaceous earths, dialdehyde starch, poly(acrylic acid), poly(ethylene oxide), poly(propylene oxide), poly(propylene glycol), polybenzylpyrrolidone and p-trimethylammonium benzaldehyde chloride.

3. A solute adsorptive material according to claim 1 the coated adsorbent having been exposed to gaseous alkylene oxide to modify the properties of the polymeric membraneous coating.

4. A solute absorptive material for use in the removal of substances from blood or body fluids, comprising the adsorptive material claimed in claim 1 having thereon a coating of plasma protein.

5. A method of preparing the solute-adsorptive material comprising treating a granular or particulate adsorbent with a solution of a copolymer in a solvent therefore, and removing the solvent by evaporation to form a semi-permeable membraneous coating on the said absorbent; the said copolymer comprising a copolymer of a first comonomer and a second comonomer wherein the first monomer is selected from the group consisting of acrylic acid, methacrylic acid, itaconic acid, acrylamide, hydroxyacrylamide, vinyl pyrrolidone, dimethylaminoethyl acrylate, diethylaminoethyl acrylate, dimethylaminoethyl methacrylate, diethylaminoethyl methacrylate and hydroxyethyl methacrylate and the second monomer is selected from the group consisting of esters of itaconic acid, acrylonitrile methacrylonitrile, 2-vinyl pyridine, 2-methyl-5vinyl pyridine and styrene, the said esters being selected from the group consisting of the methyl, ethyl, propyl, n-butyl, n-amyl, n-hexyl, n-heptyl, n-octyl, isobutyl, sec-butyl, iso-amyl, t-butylaminoethyl and hydroxypropyl esters.

6. A method according to claim 5 wherein the particulate granular adsorbent is selected from the group consisting of charcoal active carbon, alumina, silica gel, ion-exchange resin, granulated clay, chalk, starch, molecular sieves, diatomaceous earths, dialdehyde starch, poly(acrylic acid), poly(ethylene oxide), poly(propylene oxide), poly(propylene glycol), polybenzylpyrrolidone and p-trimethylammonium benzaldehyde chloride.

7. A method according to claim 5, including the step of exposing the coated adsorbent to a gaseous alkylene oxide to modify the properties of the polymeric membraneous coating.

8. A method according to claim 5, including the step of contacting the coated adsorbent with plasma protein to provide a coating of plasma protein on the coated adsorbent.

* * * * *